(12) United States Patent
Mahajan et al.

(10) Patent No.: US 7,689,419 B2
(45) Date of Patent: Mar. 30, 2010

(54) UPDATING HIDDEN CONDITIONAL RANDOM FIELD MODEL PARAMETERS AFTER PROCESSING INDIVIDUAL TRAINING SAMPLES

(75) Inventors: Milind V. Mahajan, Redmond, WA (US); Alejandro Acero, Bellevue, WA (US); Asela J. Gunawardana, Seattle, WA (US); John C. Platt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1224 days.

(21) Appl. No.: 11/233,148

(22) Filed: Sep. 22, 2005

(65) Prior Publication Data

US 2007/0067171 A1    Mar. 22, 2007

(51) Int. Cl.
G10L 15/00 (2006.01)
(52) U.S. Cl. .................................. 704/256.2
(58) Field of Classification Search ................. 704/250, 704/255, 256.2
See application file for complete search history.

(56) References Cited

OTHER PUBLICATIONS

Young, (1999, Acoustic modeling for large vocabulary continuous speech recognition, Proc. NATO Advance Study Institute).*
Wallach (2004, "Conditional Random Fields: An Introduction," CIS Technical report, Feb. 24, 2004, University of Pennsylvania).*
S. Zahorian et al., Phone Classification with Segmental Features and a Binary-Pair Partitioned Neural Network Classifier. ICASSP, vol. 2 pp. 1011-1014, 1997.
A. Halberstadt et al., Heterogeneous Acoustic Measurements for Phonetic Classification. Eurospeech 1997.
J. Lafferty et al., Conditional Random Fields: Probabilistic Models for Segmenting and Labeling Sequence Data. ICML, pp. 282-289, 2001.
A. McCallum, Efficiently Inducing Features of Conditional Random Fields. UAI 2003.
S. Wang et al., The Latent Maximum Enthropy Principle IEEE 2002.
W. Macherey et al., A Comparative Study on Maximum Entropy and Discriminative Training for Acoustic Modeling in Automatic Speech Recognition. Eurospeech pp. 493-496 2003.
S. Kakade et al., An Alternate Objective Function for Markovian Fields ICML 2002.
Ruslan Salakhutdinov et al., Optimization with EM and Expectation-Conjugate-Gradient ICML 2003.
F. Sha et al., Shallow Parsing with Conditional Random Fields. HLT/NAACL 2003.
P. Clarkson et al., On the Use of Support Vector Machines for Phonetic Classification. ICASSP, 1999.
C. F. Jeff Wu "On the Convergence Properties of the EM Algorithm" Ann Stat vol. 11(1), 1983, p. 95-103.
Darroch, J.N. et al., "Generalized Iterative Scaling for Log-Linear Models". Ann Math Stat vol. 43(5), 1972, p. 1470-1480.

(Continued)

*Primary Examiner*—Angela A Armstrong
(74) *Attorney, Agent, or Firm*—Joseph R. Kelly; Westman, Champlin & Kelly, P.A.

(57) ABSTRACT

A method and apparatus are provided for training parameters in a hidden conditional random field model for use in speech recognition and phonetic classification. The hidden conditional random field model uses parameterized features that are determined from a segment of speech, and those values are used to identify a phonetic unit for the segment of speech. The parameters are updated after processing of individual training samples.

15 Claims, 3 Drawing Sheets

OTHER PUBLICATIONS

Gopalakrishnan, P.S. et al., "An Inequality for Rational Functions With Applications to Some Statistical Estimation Problems". IEEE Trans. Inf. Theory vol. 37(1), Jan. 1991, p. 107-113.

Rathinavelu Chengalvarayan, et al., "HMM-Based Speech Recognition Using State-Dependent, Discriminatively Derived Transforms on Mel-Warped DFT Features". IEEE. Trans Speech Aud Proc. vol. 5(3), May 1997, p. 243-256.

Biing-Hwang Juang, et al., "Discriminative Learning for Minimum Error Classification", IEEE Trans. Sig. Proc. vol. 40 (12), Dec. 1002, p. 3043-3054.

Hong-Kwang, et al., "Maximum Entropy Direct Models for Speech Recognition" ASRU '03, 2003 IEEE Workshop on Automatic Speech Recognition and Understanding, 2003, Nov. 20-Dec. 3, 2003 p. 1-6.

Stanley, F., et al., A Gaussian Prior for Smoothing Maximum Entropy Models. Technical Report CMU-CS-99-108, 1999.

* cited by examiner

UPDATING HIDDEN CONDITIONAL RANDOM FIELD MODEL PARAMETERS AFTER PROCESSING INDIVIDUAL TRAINING SAMPLES

BACKGROUND

In phonetic classification and speech recognition, Hidden Markov Models (HMMs) have been used extensively to model the acoustics of speech. HMMs are generative models that use the concept of a hidden state sequence to model the non-stationary of the generation of observations from a label. At each frame of an input signal, the HMM determines the probability of generating that frame from each possible hidden state. This probability is determined by applying a feature vector derived from the frame of speech to a set of probability distributions associated with the state. In addition, the HMM determines a probability of transitioning from a previous state to each of the states in the Hidden Markov Model. Using the combined transition probability and observation probability, the Hidden Markov Model selects a state that is most likely to have generated the frame.

One limitation of Hidden Markov Models is that the probabilities of each state are determined using the same feature vectors, and thus the same collection of features are used against each state. This limitation is undesirable because different features are more important for certain speech sounds than for others. For example, when distinguishing vowel sounds from each other, the value of the formants are important. However, when distinguishing between fricatives, information as to whether the speech is voiced or unvoiced is informative. However, HMM systems do not allow the system to be able to use different features for states associated with different speech sounds.

In addition, HMM models do not allow a change in the length of between-frame dependencies for the features. Thus, at each frame, the features provide a fixed amount of information about previous frames. To help distinguish between speech sounds, current systems do not allow for different length frame dependencies for states associated with different speech sounds. Also, HMM models do not allow any flexibility in the amount of acoustic data that is summarized in each frame. Typically, frames are generated by analyzing 25 millisecond segments of acoustic waveform. This is a compromise between the long time scales required for frequency analysis of voiced sounds such as vowels and the short time scales required for reliably detecting short sounds such as plosives.

In the field of sequence labeling, conditional random field models have been used that avoid some of the limitations of Hidden Markov Models. In particular, conditional random field models allow observations taken across an entire utterance to be used at each frame when determining the probability for a label in the frame. In addition, different labels may be associated with different features, thereby allowing a better selection of features for each label.

One problem with CRF models is that they have required that the states be known at the time of training. As such, the CRF models cannot model hidden states since the hidden states are unknown at training. As such, CRF models have not been used in speech recognition and phonetic classification.

Recently, an extension to conditional random field models has been suggested that incorporates hidden states. However, it has not been suggested or shown that this extension of the conditional random field models can be used in speech recognition or phonetic classification. In particular, the hidden states shown in the extension do not correspond to hidden states traditionally used in speech recognition, which are associated with particular phonetic units.

In addition, training CRF-type models presents some difficulties. Some techniques for training such models include the estimation maximization (EM) algorithm that uses an iterative scaling approach such as Generalized Iterative Scaling (GIS) or a batch level gradient-based approach such as the limited-memory Broyden-Flecher-Goldfarb-Shanno (L-BFGS) update approach. These training methods are batch methods that process all of the training data once in each iteration of training before updating the model parameters. Many iterations are usually required to reach a desired level of performance. Thus, training can be slow and cumbersome.

The discussion above is merely provided for general background information and is not intended to be used as an aid in determining the scope of the claimed subject matter.

SUMMARY

A method and apparatus are provided for training parameter vectors in a hidden conditional random field model for use in speech recognition and phonetic classification. The hidden conditional random field model uses parameterized features that are determined from a segment of speech, and those values are used to identify a phonetic unit for the segment of speech. The parameter vectors are updated after processing of individual training samples.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

DETAILED DESCRIPTION

The invention relates to training parameters in hidden conditional random field models. However, before describing the invention in more detail, one illustrative environment in which the present invention can be used will be described.

Figure 1:
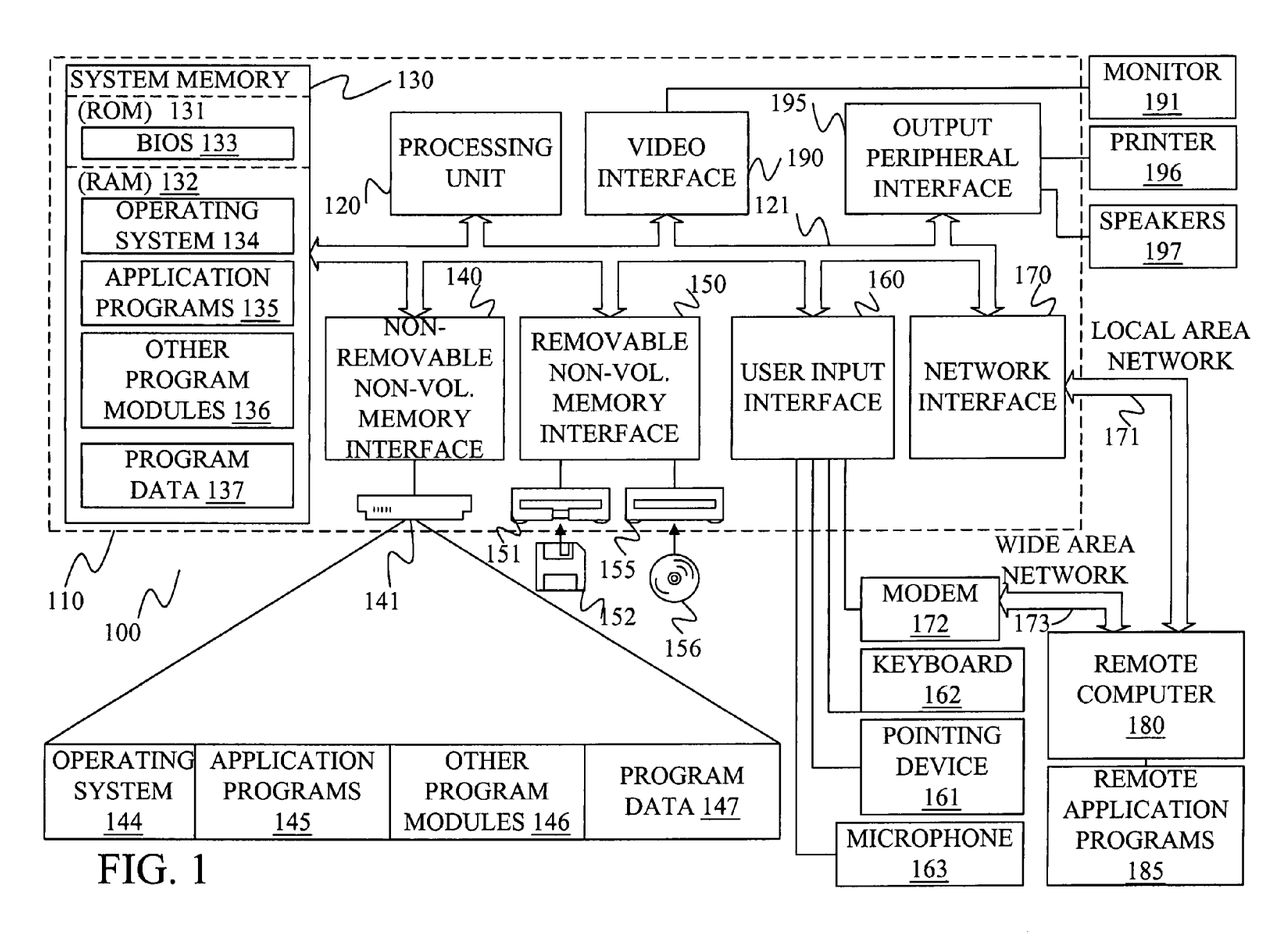
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

In accordance with one embodiment, phonetic classification and speech recognition are performed using conditional random field models with hidden states, referred to as hidden conditional random field models. A hidden conditional random field model provides a probability of a label, such as the identity of a phoneme, or a label sequence, such as a word sequence, given the sequence of observations and a set of parameters.

More specifically, the hidden conditional random field model gives the conditional probability of a segment (e.g., phonetic) label or label sequence w given the observation sequence $o=(o_1 \ldots o_T)$ as follows:

$$p(w \mid o; \lambda) = \frac{1}{z(o; \lambda)} \sum_{s \in w} \exp\{\lambda \cdot f(w, s, o)\}. \quad \text{Eq. 1}$$

Where $s=(s_1, \ldots s_T)$ is a hidden state sequence that agrees with w; $f(w,s,o)$ is a vector of sufficient statistics referred to as the feature vector; $\lambda$ is a vector of parameters; and $z(o;\lambda)$ is a partition function.

It will be noted that if the hidden state sequence s is not marginalized out, this would result in a conditional random field $p(w,s|o;\lambda)$ rather than a hidden conditional random field. The marginalization is over state sequences that belong to the model for w.

Note also that in this context, the term feature vector refers to the vector of sufficient statistics used by the model, and not the output of an acoustic front-end. The latter is referred to as an observation vector.

The partition function z, ensures that the model is a properly normalized probability, and is given as follows:

$$z(o; \lambda) = \sum_{w, s \in w} \exp\{\lambda \cdot f(w, s, o)\}. \quad \text{Eq. 2}$$

The choice of sufficient statistics determines the dependencies modeled by the hidden conditional random field. In order to initialize the parameter of a hidden conditional random field (HCRF) from the parameters of a Gaussian-emission Hidden Markov Models (HMMs), the sufficient statistics used in the HCRFs in the present discussion are the same as those used in HMMs. Namely, a vector of sufficient statistics $f$ is used with the following components:

Eq. 3 language model features:

$$f_{w'}^{(LM)}(w,s,o) = \delta(w=w') \forall w'$$

Eq. 4 transition features:

$$f_{ss'}^{(Tr)}(w, s, o) = \sum_{t=1}^{T} \delta(s_{t-1} = s)\delta(s_t = s') \; \forall \, s, s'$$

Eq. 5 occupancy features:

$$f_s^{(Occ)}(w, s, o) = \sum_{t=1}^{T} \delta(s_t = s) \; \forall \, s$$

Eq. 6 first and second moments:

$$f_s^{(M1)}(w, s, o) = \sum_{t=1}^{T} \delta(s_t = s) o_t \; \forall \, s$$

$$f_s^{(M2)}(w, s, o) = \sum_{t=1}^{T} \delta(s_t = s) o_t^2 \; \forall \, s, \quad \text{Eq. 7}$$

Where $\delta(s=s')$ is equal to one when $s=s'$ and zero otherwise.

Each (unigram) language model feature $f_w^{(LM)}$ triggers on the occurrence of the label w. The transition features $f_{ss'}^{(Tr)}$ count the number of times the transition ss' occurs in s, while the occupancy features $f_s^{(Occ)}$ count the occurrences of the state s. The first and second moments $f_s^{(M1)}$ and $f_s^{(M2)}$ are the sum and sum of squares of observations that align with the state s. These sufficient statistics may be recognized as the ones that are commonly accumulated in order to estimate HMMs. Since all components of $f$ are sums of the terms that involve at most pairs of neighboring states, the state sequence is Markov given the observation sequence, which allows the use of dynamic programming algorithms such as forward-backward and Viterbi as with HMMs. Note that for simplicity, we have only given expressions for using scalar observations and single Gaussian emission densities: alternatively, vector-valued observations and mixture densities can be used as well.

It will be noted that setting the corresponding components of $\lambda$ to:

$$\lambda_{w'}^{(LM)} = \log \mu_{w'} \; \forall \, w' \quad \text{Eq. 8}$$

$$\lambda_{ss'}^{(Tr)} = \log a_{ss'} \; \forall \, s, s' \quad \text{Eq. 9}$$

$$\lambda_s^{(Occ)} = -\frac{1}{2}\left(\log 2\pi\sigma_s^2 + \frac{\mu_s^2}{\sigma_s^2}\right) \forall \, s \quad \text{Eq. 10}$$

$$\lambda_s^{(M1)} = \frac{\mu_s}{\sigma_s^2} \forall \, s \quad \text{Eq. 11}$$

$$\lambda_s^{(M2)} = \frac{1}{2\sigma_s^2} \forall \, s \quad \text{Eq. 12}$$

gives the conditional probability density function induced by an HMM with transition probabilities $a_{ss'}$, emission means $\mu_s$, emission covariance $\sigma_s^2$ and unigram probability $\mu_w$.

Note that equation (1) with the feature vector $f$ of equation (5) gives a valid conditional probability for any value of the parameter vector $\lambda$. However, not every value of $\lambda$ corresponds to an HMM. In particular, $\lambda_s^{(M2)}$ may be non-negative, and $\lambda_s^{(Occ)}$ and $\lambda_{ss'}^{(Tr)}$ may include a weight that emphasizes or deemphasizes a particular state or transition. Therefore, even though they model the same dependencies through the same sufficient statistics, the HMMs give a constrained subset of the set of HCRF conditional probabilities.

The hidden conditional random fields discussed above are able to use features which can be arbitrary functions of the observation without complicating training. As discussed above, the present discussion proceeds with respect to the features being based on the standard per-frame Mel-Frequency Cepstral Coefficient (MFCC) based front-end which has typically been used in speech recognition. However, the features need not be so limited, and the invention is not to be limited to these particular features. In fact any feature of the form $f(s_{\tau-1}, s_\tau, o, \tau)$ can be used.

It is possible to train the HCRFs discussed herein using generalized estimation maximization (GEM) training where the M-step is an iterative algorithm such as generalized iterative scaling (GIS) or L-BFGS, rather than a closed form solution. Alternatively, however, direct optimization of the conditional log-likelihood may be desirable, because it avoids the indirection involved in the use of the EM auxiliary function. It will also be noted, of course, even though the present discussion proceeds with respect to the discriminative loss function being the conditional log-likelihood, the present approach is generalizable to other smooth discriminative criteria such as the conditional expectation of the raw phone or word error rate, or the smoothed empirical error of the training data, etc.

In any case, because direct optimization of the conditional log-likelihood of the training set has been chosen rather than a type of EM algorithm, the parameters $\lambda$ must be estimated to maximize the conditional log-likelihood of the training set as follows:

$$L(\lambda) = \sum_{n=1}^{N} \log p(w^{(n)} | o^{(n)}; \lambda). \qquad \text{Eq. 13}$$

Different methods may be used to directly optimize the conditional log-likelihood, for example, L-BFGS. While the L-BFGS method is a well-known, low-memory quasi-Newton method which has been applied successfully to the estimation of conditional random field parameters, it is a batch training method which uses the statistics, such as the gradient $\nabla L(\lambda)$ computed from the entire training set in order to make an update to the parameter vector $\lambda$. In contrast, the stochastic gradient descent (SGD) method updates the parameter vector after processing each single training sample using noisy estimates of the gradient $\nabla L(\lambda)$. More specifically, if $(w^{(1)}, o^{(1)}) \ldots (w^{(N)}, o^{(N)})$ is the entire sequence of training samples processed by SGD, then updates to the parameter vector $\lambda$ can be calculated as follows:

$$\lambda^{(n+1)} = \lambda^{(n)} + \eta^{(n)} U^{(n)} \nabla_\lambda \log p(w^{(n)} | o^{(n)}; \lambda^{(n)}) \qquad \text{Eq. 14}$$

where $\eta^{(n)}$ is the learning rate, and $U^{(n)}$ is a conditioning matrix which can be used to speed up the convergence. Computing the optimized parameter vector values is discussed below with respect to FIG. 3. Before describing the method for training the parameters, a training system will be described.

Figure 2:
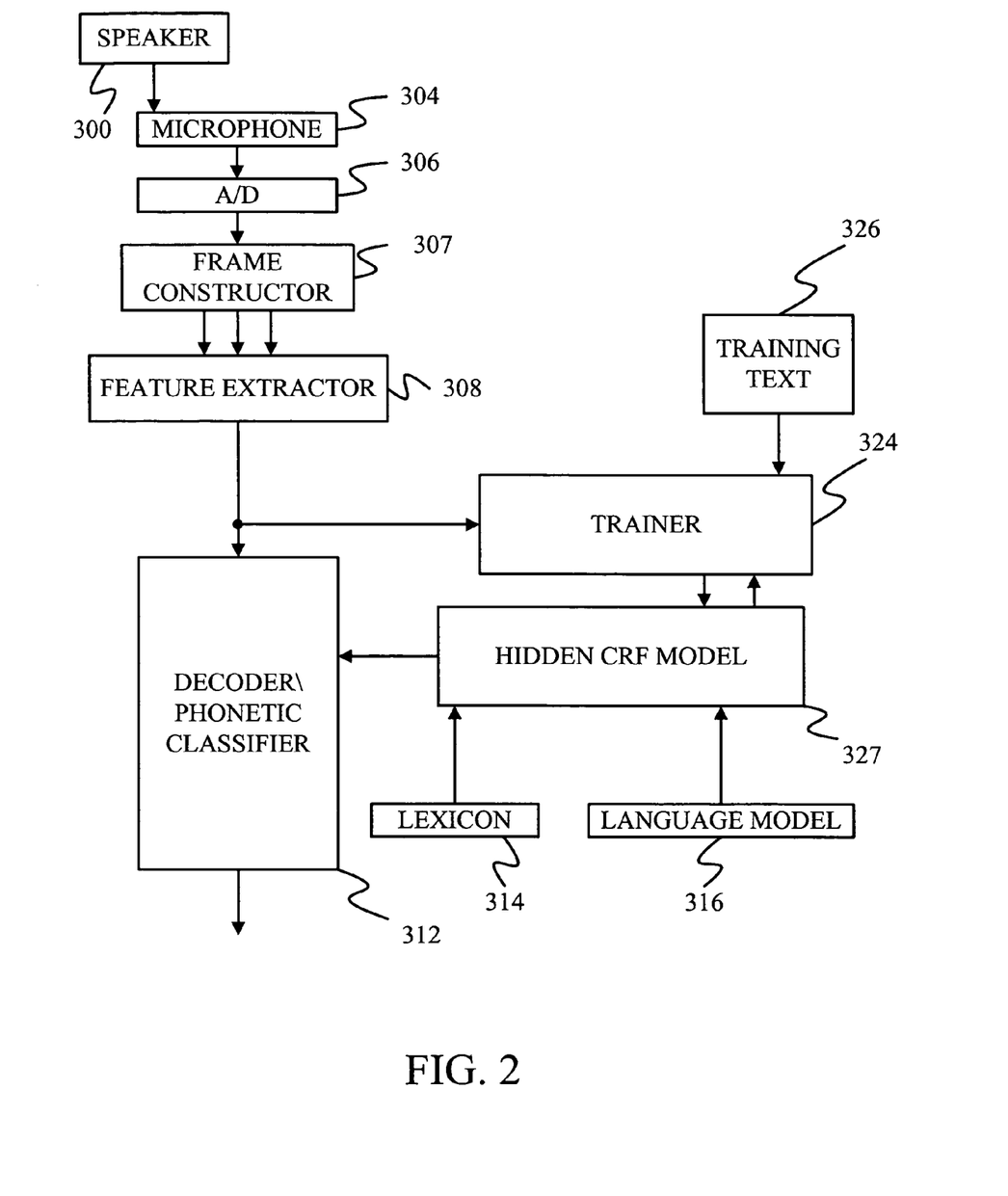
FIG. 2 is a block diagram of a speech recognition/phonetic classifier training and decoding system under one embodiment of the present invention.

FIG. 2 provides a block diagram of a system for training the parameters $\lambda$ of the hidden conditional random field model that is used to perform phonetic classification and speech recognition. In FIG. 2, a speaker 300 speaks into a microphone 304, which converts the audio signal into an electrical signal. The electrical signal is provided to an analog-to-digital (A/D) converter 306.

A/D converter 306 converts the analog signal from microphone 304 into a series of digital values. In one embodiment, A/D converter 306 samples the analog signal at 16 kilohertz and 16 bits per sample, thereby creating 32 kilobytes of speech data per second. These digital values are provided to a frame constructor 307, which, in one embodiment, groups the values into 25 millisecond frames that start 10 milliseconds apart. In some embodiments, frame constructor 307 is able to construct multiple frames of different sizes.

The frames of data created by frame constructor 307 are provided to feature extractor 308, which extracts a set of features from each frame. Examples of feature extraction modules include modules for performing linear predictive coding, LPC derived cepstrum, perceptive linear prediction (PLP) auditory model feature extraction, and Mel-frequency cepstral coefficients (MFCC) feature extraction. In addition, feature extractor 308 can also extract features such as whether a frame is voiced or unvoiced, and information on the values of formants in the frame. Note that the invention is not limited to these feature extraction modules and that other modules and other features may be used within the context of the present invention.

Figure 3:
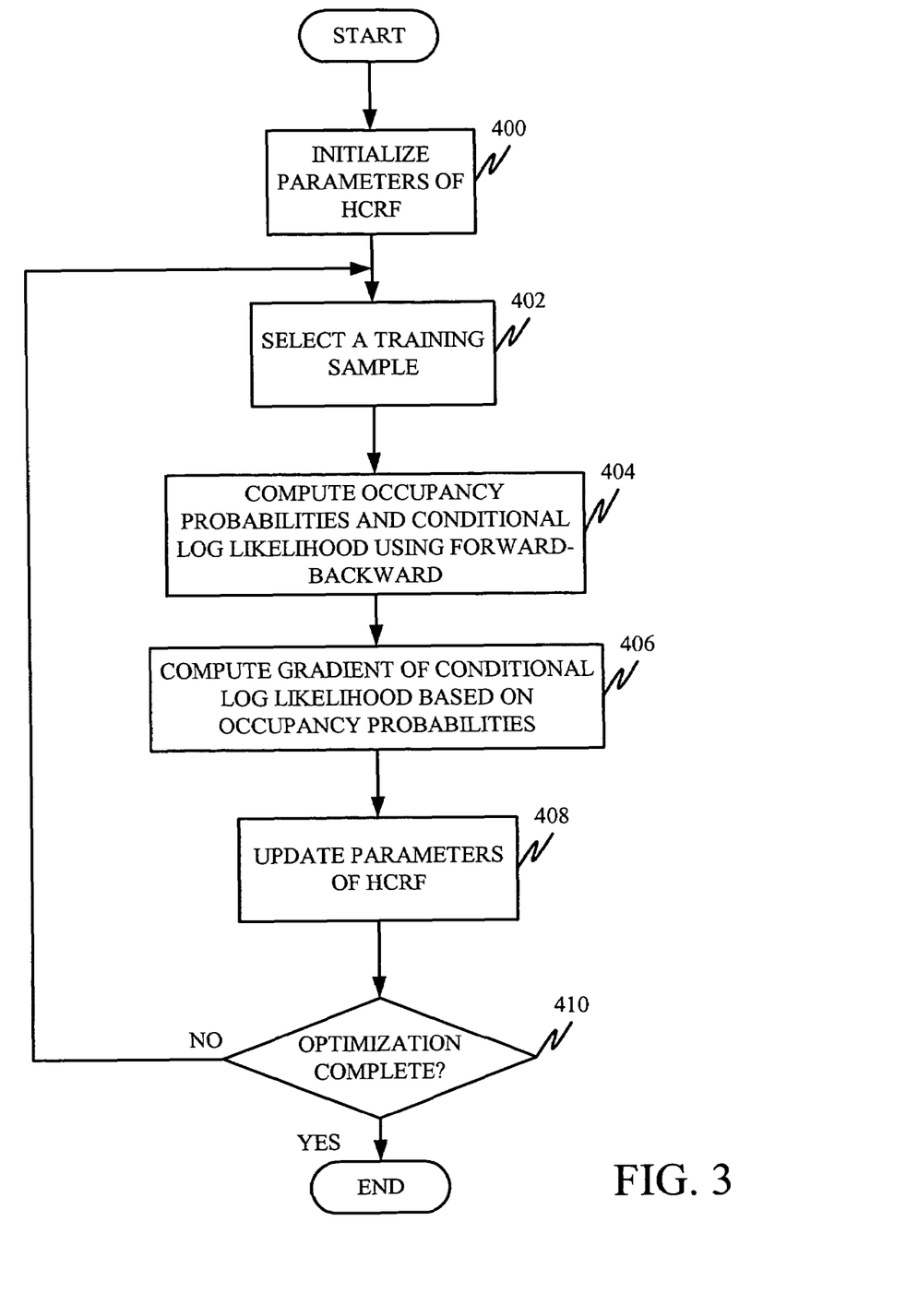
FIG. 3 is a flow diagram for training a hidden conditional random field model in accordance with one embodiment of the present invention.

Before the hidden conditional random field model of the present invention can be used, it must be trained by a trainer 324. Trainer 324 determines the model parameters for hidden conditional random field (HCRF) model 327 based on the features from feature extractor 308 and a training text 326. Specifically, trainer 324 uses a direct optimization approach for optimizing the discriminative loss function and selects parameters for hidden CRF model 327 by updating the parameter vector more frequently than once after each pass through the training data. Instead, trainer 324 may illustratively update the parameter vector after processing each single training sample. This can be done, for instance, using noisy estimates of the gradient $\nabla L(\lambda)$. FIG. 3 is a flow diagram illustrating this in more detail.

It will be noted that, in one embodiment, a constant learning rate $\eta^{(n)} = \eta$ and an identity conditioning matrix $U^{(n)} = I$ is used in updating the parameter vector in Eq. 14.

In order to begin training, trainer 324 first initializes the hidden conditional random field model 327 by initializing the parameters of the HCRF. In one illustrative embodiment, this is done using maximum likelihood, maximum mutual information, or minimum word or phone error trained HMM parameters, using the relations specified in equations 8 through 12. Initializing the parameter vector is indicated by block 400 in FIG. 3.

Trainer 324 then selects a training sample from training text 326. This is indicated by block 402 in FIG. 3. The training samples processed by the stochastic gradient descent process in trainer 324 can be randomly drawn from the training text 326 and, in fact, the same sample can be processed multiple times.

The stochastic gradient descent process requires the computation of the gradient of $\log P(\hat{w} | \hat{o})$. It will be noted that taking the gradient of Eq. 1 above and rearranging terms, provides:

$$\nabla \lambda \log p(\hat{w}|\hat{o}; \lambda) = \sum_{s \in \hat{w}} f(\hat{w}, s, \hat{o}) p(s|\hat{w}, \hat{o}, \lambda) - \sum_{w, s \in w} f(w, s, \hat{o}) p(w, s|\hat{o}; \lambda)$$ Eq. 15

Substituting the vector of sufficient statistics $f$ from Eq. 5 above into the gradient in Eq. 15 it can be seen that the first and second terms are the numerator and denominator counts using a MMI estimation of HMMs. Because the HCRF imposes a Markov structure on the state sequences, these statistics can be efficiently computed from the occupancy probabilities:

$$p(s_{t-1}=s, s_t=s'|w,o)$$
$$p(s_t=s|w,o)$$ Eq. 16 which can in turn be computed using a forward-backward algorithm, just as with MMI estimation of HMMS. Therefore, trainer 324 computes the occupancy probabilities as indicated by block 404 in FIG. 3. This is performed using the forward-backward recursions which are analogous to the case of HMM estimation, with the transition probability $a_{s's}$ replaced by a transition score $\exp \lambda_{s's}^{(Tr)}$ and the observation probability $N(o_t; \mu_s, \sigma_s^2)$ replaced by an observation score $\exp (\lambda_x^{(Occ)} + \lambda_s^{(M1)} o_t + \lambda_s^{(M2)} o_t^2)$. For example, the forward recursion for HCRFs is given by:

$$\alpha_t(s) = \left( \sum_{s'} \alpha_{t-1}(s') e^{\lambda_{s's}^{(Tr)}} \right) e^{(\lambda_s^{(Occ)} + \lambda_s^{(M1)} o_t + \lambda_s^{(M2)} o_t^2)}$$ Eq. 17 in contrast to:

$$\alpha_t(s) = \left( \sum_{s'} \alpha_{t-1}(s') a_{s's} \right) N(o_t; \mu_s, \sigma_s^2)$$ Eq. 18 for HMMs. Thus, the gradient of the log conditional likelihood can be efficiently computed, just as with MMI estimation of HMMs. Computing the conditional log-likelihood and gradient of the conditional log-likelihood is indicated by block 406 in FIG. 3.

Having computed these values, trainer 324 updates the parameter vector λ. This is indicated by block 408 in FIG. 3.

It will also be noted that a parameter averaging technique can be used as well to benefit the robustness of the stochastic approximation algorithm. Averaged parameters are obtained as:

$$\lambda_{avg} = \frac{1}{N} \sum_{n=1}^{N} \lambda^{(n)}$$

Trainer 324 then determines whether the optimization is complete. In other words, if the parameter vector is converging sufficiently, then the optimization is complete and the parameter vector has been adequately trained. If not, processing returns to block 402 in FIG. 3 where another training sample is selected (which can be the same one just used) and another update process is performed for updating the parameter vector according to Eq. 14.

The present invention can also be generalized to multi-component models on vector valued observations. Most state-of-the-art ASR systems use vector valued observations, which are modeled with Gaussian mixture emission densities. In this case, the corresponding HCRF model generalizes to:

$$p(w|o; \lambda) = \frac{1}{z(o; \lambda)} \sum_{(s,m) \in w} \exp\{\lambda \cdot f(w, s, m, o)\}.$$ Eq. 19

Where m is a sequence of mixture components. In principle, this can be viewed as the HCRF of equation (1) with a factored state of the form (s,m), with vector-valued first and second moment features. The forward recursions generalize to $$\alpha_t(s, m) = \left( \sum_{s'} \alpha_{t-1}(s') e^{\lambda_{s's}^{(Tr)}} \right) e^{(\lambda_{sm}^{(Occ)} + \lambda_{sm}^{(M1)} \cdot o_t + \lambda_{sm}^{(M2)} \cdot o_t^2)}$$ Eq. 20

$$\alpha_t(s) = \sum_m \alpha_t(s, m)$$ Eq. 21 where $o^2$ denotes the vector of per-component squares of the observation vector o, and the first and second moment parameters $\lambda_{sm}^{(M1)}$ and $\lambda_{sm}^{(M2)}$ are now vector valued. The backward recursions and the computation of posterior occupancy probabilities generalize analogously. Note that when an HMM is written in HCRF form, $\lambda_{sm}^{(Occ)}$ will include the logarithm of the mixture weight. If it is desirable to model dependencies between components of the observation vector (i.e., full covariance matrices in the HMM case) there can be additional second moment features for cross-terms, rather than just the squared terms as shown above.

It can be seen that, in contrast to prior techniques which used batch methods to update the parameter vector, in which all the training data is processed once for each iteration of training before updating the parameter of the model, the present invention updates the parameters more frequently. Therefore, instead of requiring many training iterations to reach acceptable levels of performance, the present system is much faster and requires far fewer iterations than batch training methods. The present system also leads to a better performance than a system trained on more iterations using the batch methods. In one embodiment, the training technique is stochastic gradient descent training and the parameter vector is updated after processing each training sample.

Although the subject matter has been described in language specific to structural features and/or methodological acts, it is to be understood that the subject matter defined in the appended claims is not necessarily limited to the specific features or acts described above. Rather, the specific features and acts described above can be disclosed as example forms of implementing the claims.

What is claimed is:

1. A computer implemented method of training a hidden conditional random field (HCRF) model using a computer with a processor, comprising:
   initializing, with the processor, parameter values for the HCRF model;
   receiving a set of training data samples having, in no particular order, a first training data sample and subsequent training data samples;
   incrementally training parameters, with the processor, for the HCRF model using each sample in the set of training data samples, by modifying the parameter values for the parameters after considering the first of the training data samples in the set and then modifying the parameter values after considering each subsequent training data sample before considering a next subsequent training data sample, to obtain a set of trained parameters; and
   outputting the HCRF model with the trained parameters for use in a recognition application.

2. The method of claim 1 wherein training the parameters for the HCRF comprises:
   performing stochastic gradient descent updates on the values of the parameters.

3. The method of claim 1 wherein modifying the values for the parameters comprises:
   averaging the values of the parameters over a number of times the values of the parameters are modified.

4. The method of claim 1 and further comprising:
   repeatedly modifying the values for the parameters after processing each sample in the set of training data samples until the values of for the parameters no longer change by a predetermined amount.

5. The method of claim 4 wherein repeatedly modifying the values for the parameters after processing each sample in the set of training data samples comprises:
   modifying the values for the parameters after processing each sample in the set of training data samples by an amount based on a predetermined learning rate.

6. The method of claim 1 wherein the discriminative loss function comprises a conditional log likelihood function.

7. The method of claim 6 wherein initializing the HCRF model comprises:
   initializing the parameters of the HCRF model with the parameters of a Hidden Markov model trained with maximum likelihood, maximum mutual information, minimum word error rate, or minimum phone error rate.

8. A training system for training a hidden conditional random field (HCRF) model for use in a speech recognition related task, comprising:
   a training component initializing the HCRF model and to directly optimize a discriminative loss function in the HCRF model by setting parameters that maximize the discriminative loss function with respect to a plurality of samples in a set of training data, wherein the training component is sets values of the parameters by modifying the values for the parameters after processing each sample in the set of training data, and before processing a next sample in the set of training data; and
   a computer processor being a functional component of the training system and activated by the training component to facilitate initialization and optimization of the discriminative loss function in the HCRF model.

9. The training system of claim 8 wherein the training component is configured to modify the values for the parameters by calculating a gradient of the discriminative loss function with respect to the samples in the set of training data.

10. The training system of claim 9 wherein the training component is configured to average the values for the parameters over a number of samples in the set of training data that are processed to identify the values of the parameters.

11. A computer readable storage medium storing computer readable instructions which, when executed by a computer with a processor, cause the computer to perform steps of:
   receiving, with the processor, a sample from a plurality of samples in a set of speech related training data;
   prior to processing a next sample from the plurality of samples, modifying, with the processor, parameter values for a hidden conditional random field (HCRF) model based on the sample to obtain a set of trained parameters;
   repeating the steps of receiving a sample and modifying parameters for each of the samples in the set; and
   outputting, with the processor, the HCRF model with the trained parameters for use in a recognition application.

12. The computer readable medium of claim 11 wherein the steps further comprise:
   initializing the parameters of an HCRF model from the parameters of a Hidden Markov Model trained using maximum likelihood, maximum mutual information, minimum word error rate, or minimum phone error rate.

13. The computer readable medium of claim 11 wherein modifying parameter values comprises:
   averaging the parameter values over a number of samples from set of speech-related training data that are processed.

14. The computer readable medium of claim 11 wherein modifying parameter values comprises:
   modifying the parameter values based on a gradient of the discriminative loss function given the received sample.

15. The computer readable medium of claim 14 wherein modifying the parameter values comprises:
   performing stochastic gradient descent updates on the parameter values after processing each sample in the set of speech related training data.

* * * * *